US 9,248,860 B2

(12) United States Patent
Saje et al.

(10) Patent No.: US 9,248,860 B2
(45) Date of Patent: Feb. 2, 2016

(54) CENTER TUNNEL INTEGRATED TRUSS ARCHITECTURE

(71) Applicant: GM Global Technology Operations LLC, Detroit, MI (US)

(72) Inventors: Robert N. Saje, Shelby Township, MI (US); Peter M. Parlow, Columbus, MI (US); Giles D. Bryer, Northville, MI (US); Artur Wyszynski, Oxford, MI (US); John C. Johnson, Macomb Township, MI (US); Daniel K. Davis, Williamston, MI (US); Keith J. Saari, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/307,758

(22) Filed: Jun. 18, 2014

(65) Prior Publication Data

US 2015/0021893 A1    Jan. 22, 2015

Related U.S. Application Data

(60) Provisional application No. 61/857,129, filed on Jul. 22, 2013.

(51) Int. Cl.
*B62D 21/00* (2006.01)
*B62D 25/20* (2006.01)

(52) U.S. Cl.
CPC ..................................... *B62D 21/00* (2013.01)

(58) Field of Classification Search
CPC ...... B62D 21/00; B62D 21/02; B62D 21/183; B62D 25/20; B62K 5/01

USPC .......... 29/897.2; 180/908; 280/781, 785, 800; 296/193.07, 204
See application file for complete search history.

(56) References Cited

U.S. PATENT DOCUMENTS

| | | | | |
|---|---|---|---|---|
| 3,366,411 A | * | 1/1968 | Vittone | 296/204 |
| 4,450,926 A | * | 5/1984 | Suzuki | 180/312 |
| 4,457,555 A | * | 7/1984 | Draper | 296/181.4 |
| 4,842,193 A | * | 6/1989 | Eger et al. | 237/12.3 A |
| 5,002,333 A | * | 3/1991 | Kenmochi et al. | 296/204 |
| 5,975,624 A | * | 11/1999 | Rasidescu et al. | 296/203.01 |
| 5,988,734 A | * | 11/1999 | Longo et al. | 296/203.01 |
| 6,270,153 B1 | * | 8/2001 | Toyao et al. | 296/204 |
| 6,431,641 B2 | * | 8/2002 | Miyasaka | 296/203.03 |
| 6,446,744 B2 | * | 9/2002 | Wubbolts et al. | 180/190 |
| 6,688,676 B1 | * | 2/2004 | Sato | 296/187.05 |
| 6,749,036 B1 | * | 6/2004 | Schrapp et al. | 180/190 |
| 6,890,010 B2 | * | 5/2005 | Bergman | 293/117 |
| 6,926,352 B2 | * | 8/2005 | Gotou et al. | 296/204 |
| 7,040,645 B1 | * | 5/2006 | Borneman et al. | 280/492 |
| 7,104,596 B2 | * | 9/2006 | Goto et al. | 296/193.07 |
| 7,434,871 B2 | * | 10/2008 | Mizuma et al. | 296/193.07 |
| 7,469,764 B2 | * | 12/2008 | Girouard et al. | 180/190 |
| 7,533,749 B1 | * | 5/2009 | Sampson et al. | 180/190 |
| 7,575,250 B2 | * | 8/2009 | Werner et al. | 280/781 |
| 7,815,000 B2 | * | 10/2010 | Kisse et al. | 180/9.1 |

(Continued)

FOREIGN PATENT DOCUMENTS

| | | | | | |
|---|---|---|---|---|---|
| JP | 01190588 A | * | 7/1989 | | B62D 21/18 |
| JP | 06144300 A | * | 5/1994 | | B62D 25/20 |

*Primary Examiner* — Laura Freedman
(74) *Attorney, Agent, or Firm* — BrooksGroup (57) ABSTRACT

A number of variations may include a center tunnel assembly which may include a series of truss structures.

17 Claims, 9 Drawing Sheets

(56) References Cited

U.S. PATENT DOCUMENTS

| | | | |
|---|---|---|---|
| 7,862,108 B2* | 1/2011 | Tamakoshi | 296/203.03 |
| 8,287,035 B2* | 10/2012 | Bufe et al. | 296/203.01 |
| 8,480,164 B2* | 7/2013 | Naoi | 296/193.09 |
| 8,517,459 B2* | 8/2013 | Klimek et al. | 296/193.07 |
| 8,616,617 B2* | 12/2013 | Sherbeck et al. | 296/187.07 |
| 8,646,833 B2* | 2/2014 | Fujii et al. | 296/209 |
| 8,668,248 B2* | 3/2014 | Ishizono et al. | 296/187.08 |
| 2009/0188100 A1* | 7/2009 | Durney et al. | 29/469 |
| 2011/0272972 A1* | 11/2011 | Takayanagi | 296/204 |
| 2012/0217078 A1* | 8/2012 | Kinsman et al. | 180/69.4 |
| 2013/0341969 A1* | 12/2013 | Fujii et al. | 296/193.07 |
| 2015/0020388 A1* | 1/2015 | Moss et al. | 29/897.2 |
| 2015/0021894 A1* | 1/2015 | Moss et al. | 280/800 |

\* cited by examiner

CENTER TUNNEL INTEGRATED TRUSS ARCHITECTURE

CROSS-REFERENCE TO RELATED APPLICATIONS

This application claims the benefit of U.S. Provisional Application No. 61/857,129 filed Jul. 22, 2013.

TECHNICAL FIELD

The field to which the disclosure generally relates to includes vehicle structures.

BACKGROUND

A vehicle may include a frame structure.

SUMMARY OF ILLUSTRATIVE VARIATIONS

One variation may include a product comprising: a center tunnel assembly comprising: an upper tunnel structure assembly, a right side front structure assembly, a left side front structure assembly, a right side rear structure assembly, a left side rear structure assembly, and a right and left close out panel assembly; and wherein the center tunnel assembly is constructed and arranged to include a plurality of trusses which are constructed and arranged to distribute various loads on the center tunnel assembly.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
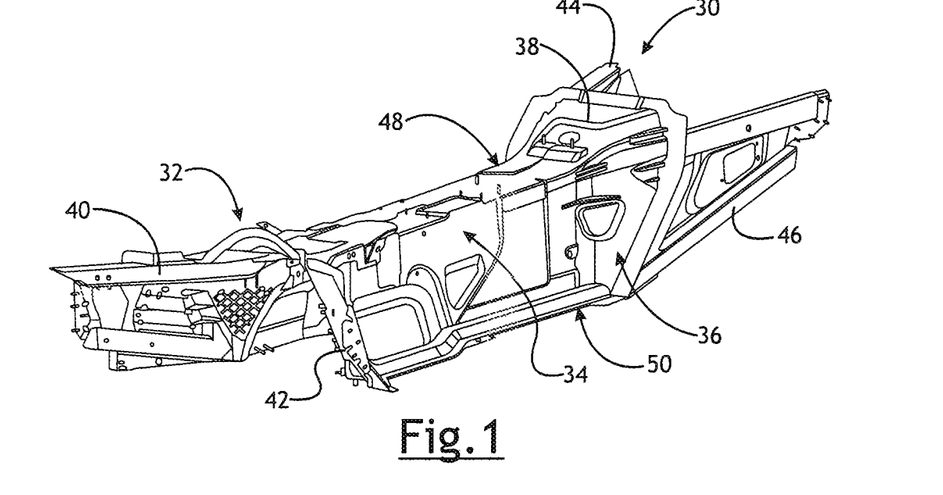
FIG. 1 illustrates a prospective view of a center tunnel assembly according to a number of variations.
Figure 2:
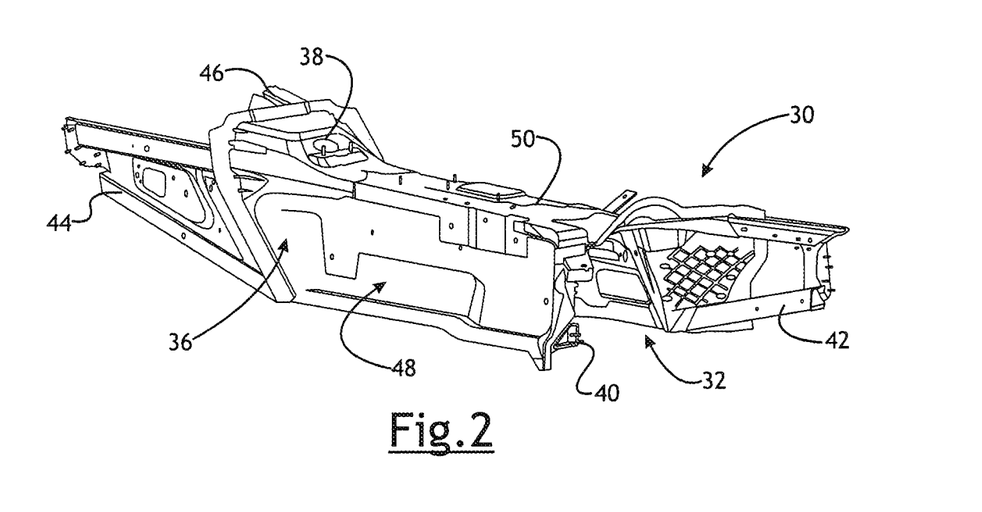
FIG. 2 illustrates a prospective view of a center tunnel assembly according to a number of variations.

Referring to FIGS. 1-2, a vehicle may include a center tunnel assembly 30 which may extend along the length of a vehicle and which may be located approximately central of the width of a vehicle. A center tunnel assembly 30 may include one or more trussing features or structures which may increase the stiffness of the center of the vehicle, which may increase the overall stiffness of the vehicle. A truss structure may include, but is not limited to, a structure which may include a series of beams or members which may form one or more triangular shapes. The triangular configuration of the beams or members may cause external forces to act primarily on the joints or corners of the triangle rather than various points along the beams or members which may cause the beams or members to be primarily in compression or primarily in tension which may increase the strength and stiffness of the structure. The truss structures may be located at the front splay region 32, center shifter region 34, and the rear splay region 36 of a vehicle center tunnel assembly 30 and may create a structural architecture that may provide structural integrity to the center tunnel assembly 30. This structural integrity may provide a vehicle with increased torsional stiffness through the center of the vehicle. This increased torsional stiffness may also allow for high open roof stiffness while also meeting a vehicle's packaging requirements.

In any of a number of variations, a center tunnel assembly 30 may include an upper tunnel structure assembly 38, a right side and a left side front structure assembly 40, 42, a right side and a left side rear side structure assembly 44, 46, and a right side and a left side close-out panel assembly 48, 50.

Figure 3:
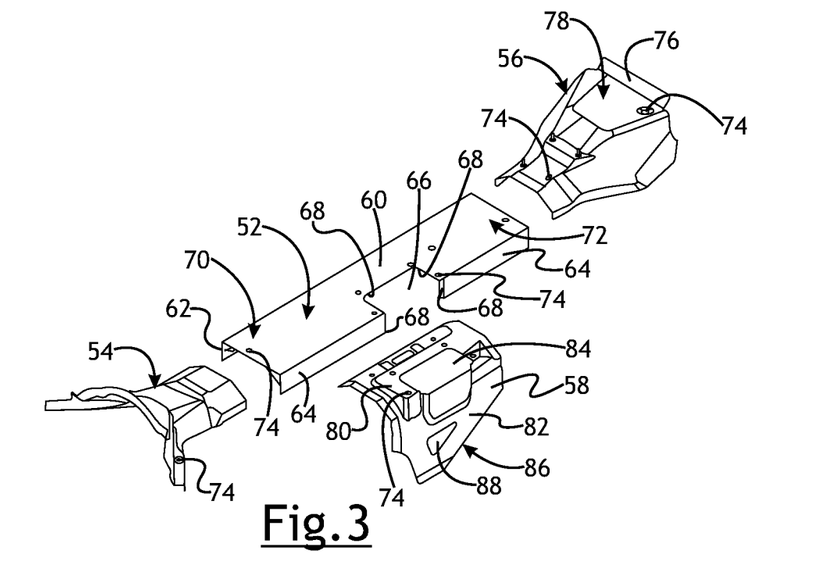
FIG. 3 illustrates an exploded view of an upper tunnel structure assembly according to a number of variations.
Figure 4:
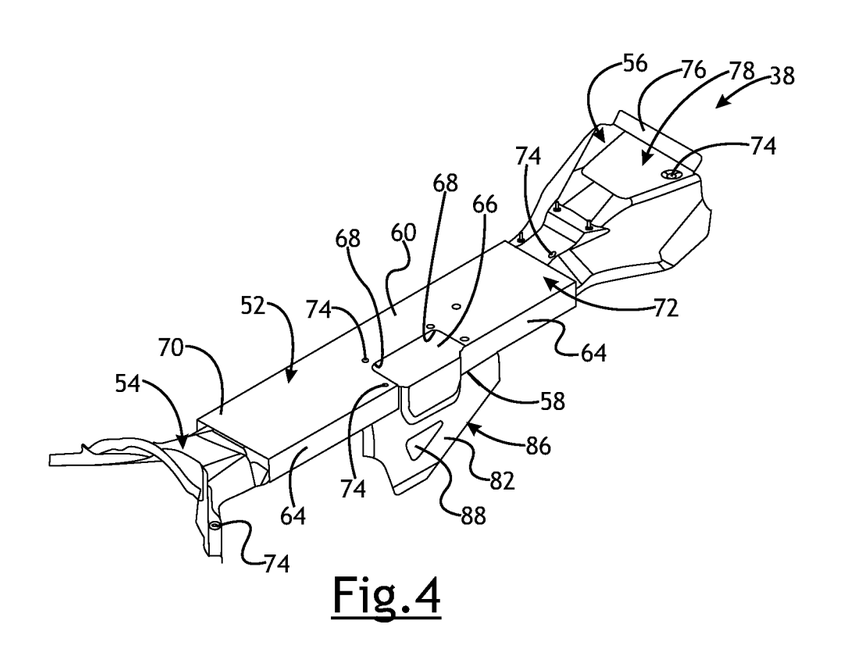
FIG. 4 illustrates a prospective view of an upper tunnel structure assembly according to a number of variations.
Figure 8:
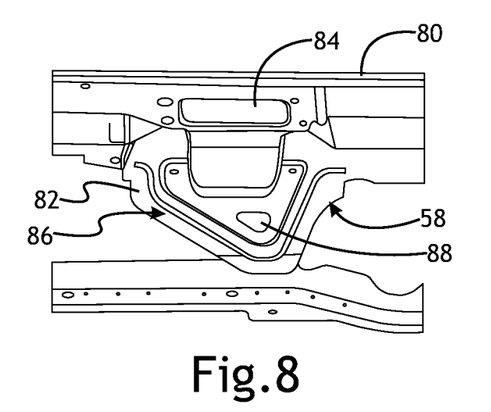
FIG. 8 illustrates a close-up inboard side view of a center portion of a center tunnel assembly according to a number of variations.

Referring to FIGS. 3-4, and 8, in any of a number of variations, an upper tunnel structure assembly 38 may include an upper tunnel structure 52, a front panel 54, a rear panel 56, and a center truss structure 58. In any of a number of variations, the upper tunnel structure 52 may include a top portion 60, which may be substantially planar, and a right side wall 62 and a left side wall 64. In any of a number of variations, a cutout 66 may be located on left hand side of the upper tunnel structure 52 and the left hand side wall 64 which may be constructed and arranged to accommodate a shifter (not illustrated). The cut out 66 may be any of a number of configurations including, but not limited to a rectangular shape, and may include a radius 68 on each corner of the cut out 66 on the upper tunnel structure 52 portion as well as a radius 68 on each corner of each side of the left hand side wall 64 surrounding the cut out 66, for example as illustrated in FIG. 3. The front portion 70 of the upper tunnel structure 52 may be constructed and arranged to attach to the front panel 54. The rear portion 72 of the upper tunnel structure 52 may be constructed and arranged to accommodate a rear panel 56. The upper tunnel structure 52 may also include one or more openings or holes 74 which may be used in the assembly of the vehicle. The upper tunnel structure 52 may comprise any of a number of materials including, but not limited to aluminum or steel, and may be formed in any of a number of variations including, but not limited to, extrusion.

A front panel 54 may be attached to the upper tunnel structure 52 in any of a number of variations including, but not limited to, resistance spot welding. In any of a number of variations, a front panel 54 may be constructed and arranged to mate with a right hand and left hand front side structure assembly 42, 44. In one variation, the front panel 54 may splay or increase in width as it extends toward the front of the vehicle. The front panel 54 may include one or more openings or holes 74 which may be used in the assembly of the vehicle. The front panel 54 may comprise any of a number of materials including, but not limited to aluminum or steel, and may be formed in any of a number of variations including, but not limited to, stamping.

A rear panel 56 may be attached to the upper tunnel structure 52 in any of a number of variations including, but not limited to, resistance spot welding. In any of a number of variations, a rear panel 56 may be constructed and arranged to mate with a right hand and left hand rear side structure assembly 44, 46. In one variation, the rear panel 56 may splay or increase in width as it extends toward the rear of a vehicle. The rear panel 56 may also include a lip 76 which may extend from the top surface 78 of the rear panel 56. The lip 76 may be constructed and arranged to mate with a seat back panel (not illustrated). The rear panel 56 may also include one or more openings or holes 74 which may be used to assemble the vehicle. The rear panel 56 may comprise any of a number of materials including, but not limited to, aluminum or steel, and may be formed in any of a number of ways including, but not limited to, stamping.

A center truss structure 58 may be attached to the upper tunnel structure 52 in any of a number of variations including, but not limited to, resistance spot welding. A center truss structure 58 may be attached the underside of the shift area of the upper tunnel structure 52, for example as illustrated in FIG. 4. In any of a number of variations, a center truss structure 58 may include an upper structure 80 and a side structure 82, for example as illustrated in FIGS. 3 and 8. The top surface 78 may be constructed and arranged to mate with the underside of the upper tunnel structure 52 and may include a cut out 84 constructed and arranged to accommodate a shifter. The upper structure 80 may also include one or more openings or holes 74 which may be used during vehicle assembly. The side structure 82 may be constructed and arranged to form a triangular structure 86 which may act as a truss which may distribute various loads lateral and vertical loads though various load paths which may increase torsional stiffness and support to the shifter region of the center tunnel 30, for example as illustrated in FIG. 8. In one variation, the width of the side structure 82 may increase as the side structure 82 extends upward toward the upper structure 80. The side structure 82 may also include an opening 88 adjacent the narrower width. The center truss structure 58 may comprise any of a number of materials including, but not limited to, aluminum or steel and may be formed in any of a number of variations including, but not limit to, stamping.

Figure 5:
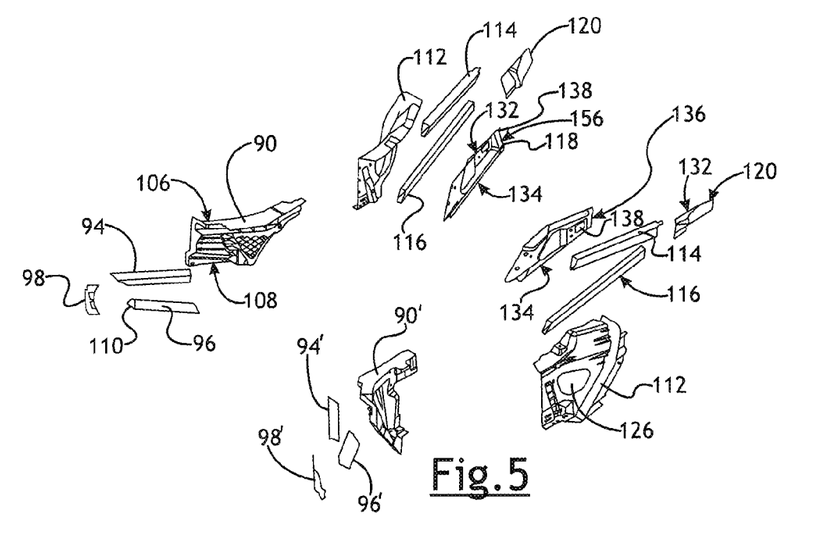
FIG. 5 illustrates an exploded view of side structure assemblies according to a number of variations.
Figure 6:
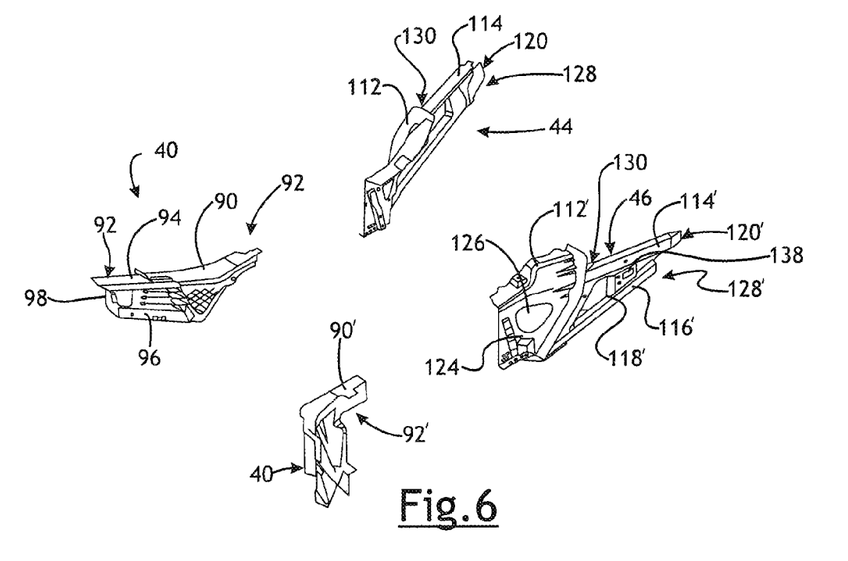
FIG. 6 illustrates a prospective view of side structure assemblies according to a number of variations.
Figure 7:
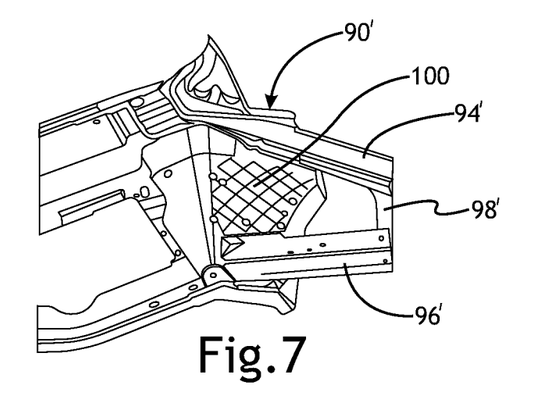
FIG. 7 illustrates a close-up inboard side view of a front portion of a center tunnel assembly according to a number of variations.
Figure 16:
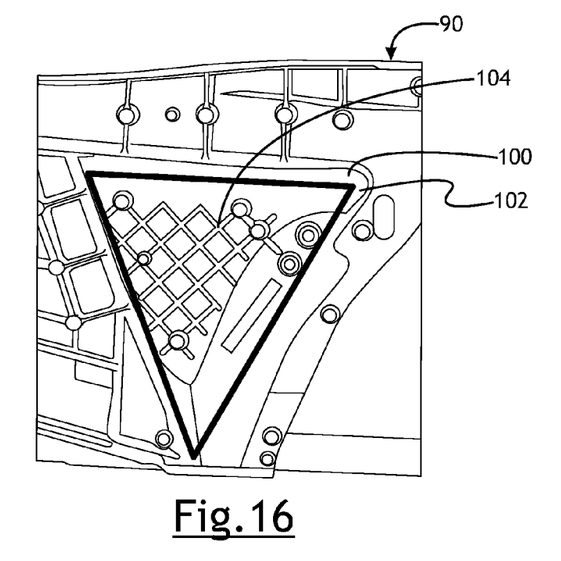
FIG. 16 illustrates a close-up inboard view of a front truss structure according to a number of variations.

Referring to FIGS. 5-7, and 16, in any of a number of variations, a center tunnel assembly 30 may include a right side and left side front structure assembly 40, 42. A right side and left side front structure assembly 40, 42 may include a front truss structure 90, 90' and a bracing subassembly 92, 92' for example as illustrated in FIG. 5. In any of a number of variations, a front truss structure 90, 90' may be constructed and arranged to form a triangular structure 100 which may act as a truss which may distribute various lateral and vertical loads though various load paths which may increase torsional stiffness and support to the center region of the vehicle which may increase overall torsional stiffness of the vehicle, for example as illustrated in FIG. 7. In a number of variations, the triangular structure 100 may form a triangular depression 102 which may be augmented with ribs 104, for example as illustrated in FIG. 16. The front truss structure 90, 90' may comprise any of a number of materials including, but not limited to, aluminum or steel, and may be formed in any of a number of variations including, but not limited to, high pressure die casting.

In any of a number of variations, a front bracing subassembly 92 may include an upper lateral beam 94, 94' a lower lateral beam 96, 96' and a vertical beam 98, 98'. In a number of variations, the upper lateral beam 94, 94' may be attached to the upper portion 106 of the front truss structure 90, 90', and the lower lateral beam 96, 96' may be attached to the lower surface 108 of the front truss structure 90, 90' and the vertical beam 98, 98' may be attached to the end 110 of the lower lateral beam 96, 96' and extend upward to the underside of the upper lateral beam 94, 94' for example as illustrated in FIGS. 6-7. The upper lateral beam 94, 94', lower lateral beam 96, 96' and the vertical beam 98, 98' may form various load paths which may work with the front truss 90, 90' to distribute various loads which may increase torsional stiffness to the center of the vehicle which may increase torsional stiffness of the overall vehicle, for example as illustrated in FIG. 7. The upper lateral beam 94, 94', lower lateral beam 96, 96', and the vertical beam 98, 98' may comprise any of a number of materials including, but not limited to, aluminum or steel. The upper lateral beam 94, 94' and lower lateral beam 96, 96' may be formed in any of a variety of ways including, but not limited to, extrusion. The vertical beam 98, 98' may be formed in any of a number of ways including, but not limited to, stamping. The front bracing subassembly 92, 92' may be assembled together and attached to the front truss structure 90, 90' in any of a number of variations including, but not limited to, gas metal arc welding and/or resistance spot welding.

Figure 9:
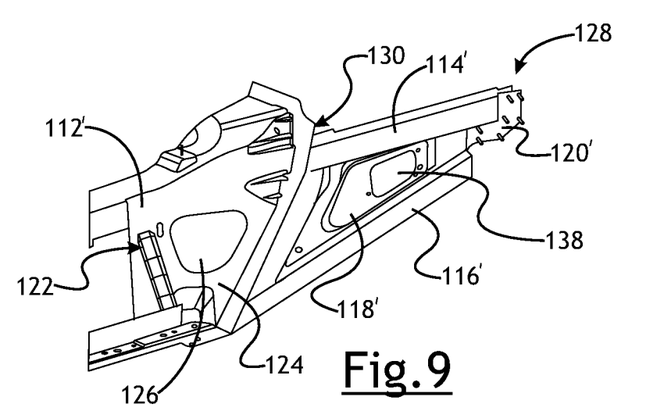
FIG. 9 illustrates a close-up outboard side view of a rear portion of a center tunnel assembly according to a number of variations.

Referring to FIGS. 5-6, and 9, a center tunnel assembly 30 may include a right side and a left side rear structure assembly 44, 46. In any of a number of variations, a right side and left side rear structure assembly 44, 46 may include a rear truss 112, 112' and a rear bracing subassembly 128, 128'. In any of a number of variations, a rear truss structure 112, 112' may be constructed and arranged to form a triangular structure 122, for example as illustrated in FIG. 9, which may act as a truss which may distribute various lateral and vertical loads though various load paths which may increase torsional stiffness and support to the center region of the vehicle which may increase overall torsional stiffness of the vehicle. In a number of variations, the rear truss structure 112, 112' may include a triangular depression 124. In any of a number of variations, the rear truss structure 112 may also include an opening 126 approximately central of the rear truss structure 112, 112'. The rear truss structure 112, 112' may comprise any of a number of materials including, but not limited to, aluminum or steel, and may be formed in any of a number of ways including, but not limited to high pressure die casting.

In any of a number of variations, a rear bracing subassembly 128, 128' may include an upper lateral beam 114, 114' a lower lateral beam 116, 116', a support panel 118, 118', and a lateral support 120, 120'. In any of a number of variations, the upper lateral beam 114, 114' may be attached to the rear portion 130 of the rear truss structure 112, 112' as well as the top portion 132 of the support panel 118, 118'. In any of a number of variations, the lower lateral beam 116, 116' may be attached to the rear portion 130 of the truss structure 112 as well as the lower portion 134 of the support panel 118, 118'. The lateral support 120, 120' may be attached to the rear portion 136 of the support panel 118, 118' as well as between the upper lateral beam 114, 114' and the lower lateral beam 116, 116', for example as illustrated in FIGS. 5-6 and 9. In any of a number of variations, the support panel 118, 118' may include an opening 138 at its rear portion 130. The bracing subassembly 128, 128' may work with the rear truss structure 112, 112' to distribute various loads which may increase torsional stiffness to the center of the vehicle which may increase torsional stiffness of the overall vehicle, for example as illustrated in FIG. 9. The upper lateral beam 114, 114' and lower lateral beam 116, 116' may comprise any of a number of materials including, but not limited to aluminum or steel and may be formed in any of a number of variations including, but not limited to, extrusion. The support panel 118, 118' and lateral support 120, 120' may comprise any of a number of materials including, but not limited to, aluminum and/or steel, and may be formed in any of a number of variations including, but not limited to, stamping. The rear bracing subassemblies 128, 128' may be assembled together and attached to the rear truss structures 112, 112' in any of a number of variations including, but not limited to, gas metal arc welding and/or resistance spot welding.

Figure 10:
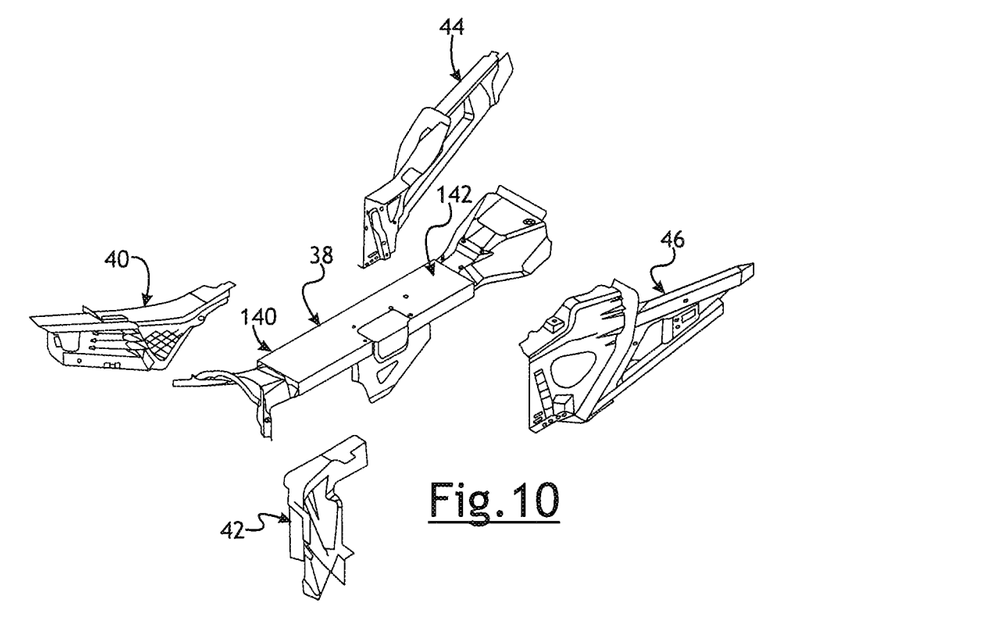
FIG. 10 illustrates an exploded view of an upper tunnel structure assembly and side structure assemblies according to a number of variations.
Figure 11:
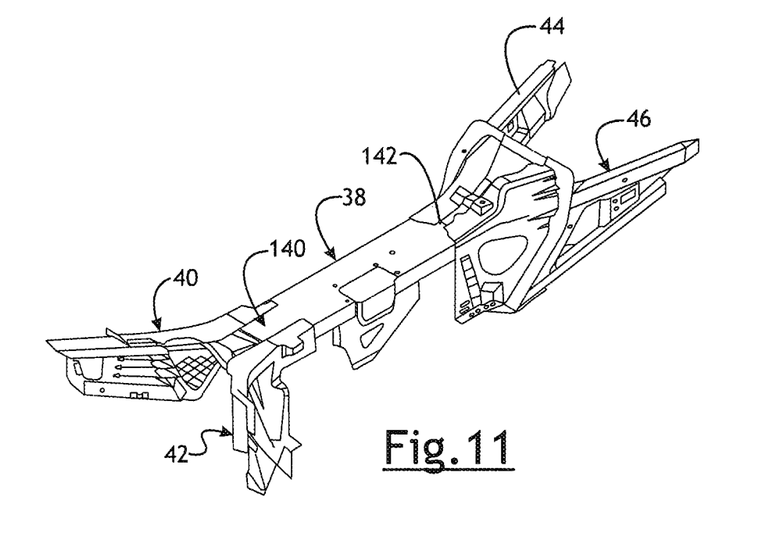
FIG. 11 illustrates a prospective view of an upper tunnel assembly and side structure assemblies according to a number of variations.

Referring to FIGS. 10-11, in any of a number of variations, the right side and left side front and rear structure assemblies 40, 42, 44, 46 may be attached to the upper tunnel structure assembly 38. In one variation, the right side and left side front structure assemblies 40, 42 may be attached to the upper tunnel structure 52, front panel 54, and the front portion 140 of the upper tunnel structure assembly 38. This may provide additional torsional stiffness to the front splay area of the center tunnel 30. In any of a number of variations, the right side and left side rear structure assemblies 44, 46, may be attached to the upper tunnel structure assembly 38 rear panel 56 and the rear portion 142 of the upper tunnel structure 52. This may provide additional stiffness to the rear splay area of the center tunnel 30. The right side and left side front and rear structure assemblies 40, 42, 44, 46 may be attached to the upper tunnel structure assembly 38 in any of a number of variations including, but not limited to, metal gas arc welding and/or resistance spot welding.

Figure 12:
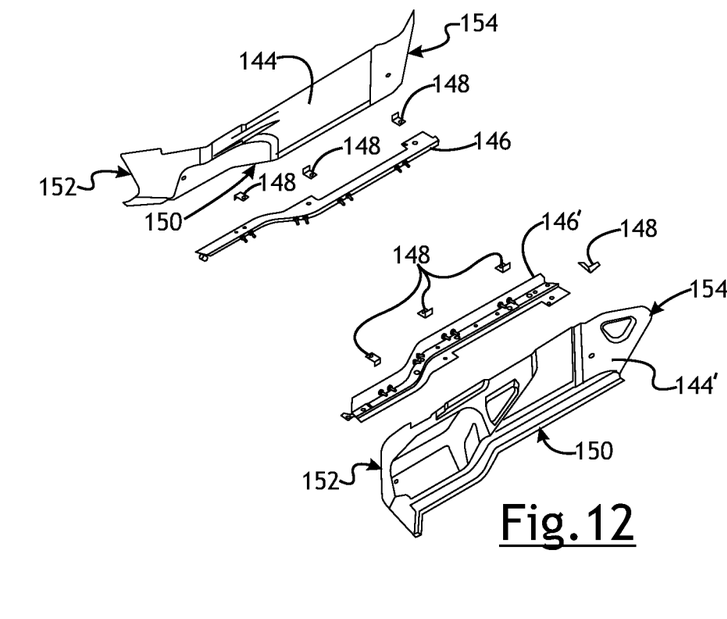
FIG. 12 illustrates an exploded view of center tunnel side panel assemblies according to a number of variations.
Figure 13:
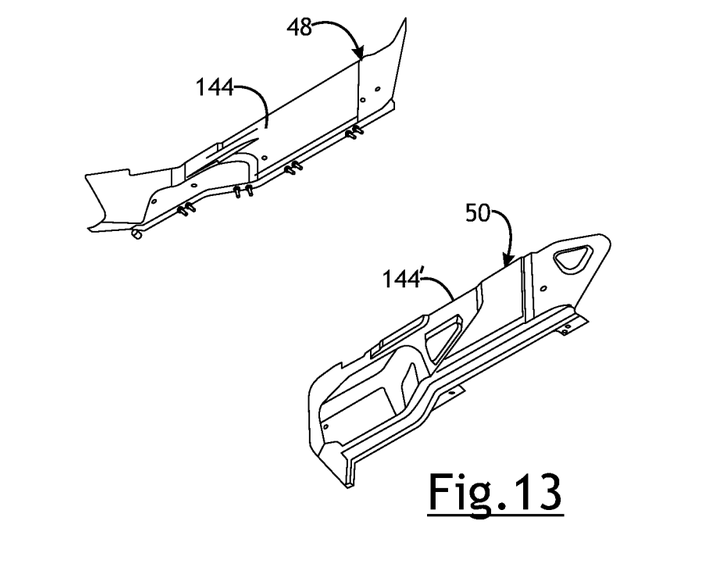
FIG. 13 illustrates a prospective view of center tunnel side panel assemblies according to a number of variations.
Figure 14:
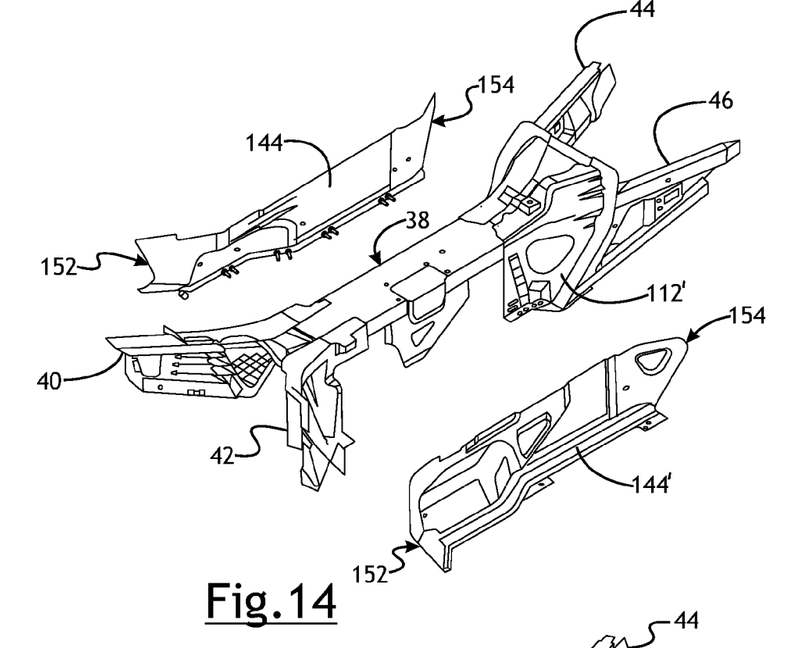
FIG. 14 illustrates an exploded view of a center tunnel assembly according to a number of variations.

Referring to FIGS. 12-13, and 14, a center tunnel assembly 30 may include a right side and left side center tunnel close-out panel assembly 48, 50. In any of a number of variations, a center tunnel close-out panel assembly 48, 50 may include a close-out panel 144, 144', a lateral close-out panel beam 146, 146' and one or more brackets 148. The close-out panel 144, 144' may be constructed and arranged to mate with the front and rear side structure assemblies 40, 42, 44, 46, as well as the center truss 58. The center tunnel close-out panel 144, 144', the close-out panel lateral beam 146, 146', and the brackets 148 may comprise any of a number of materials including, but not limited to, aluminum and/or steel. The center tunnel lateral beam 146, 146', and brackets 148 may be attached to the lower portion 150 of the close-out panel 144, 144' for example as illustrated in FIG. 13, in any of a number of variations, including, but not limited to, laser welding.

Figure 15:
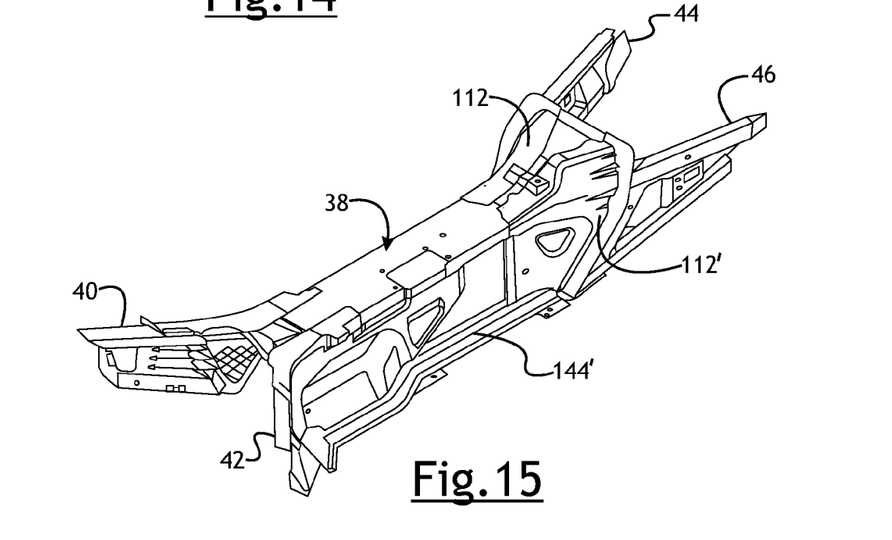
FIG. 15 illustrates a prospective view of a center tunnel assembly according to a number of variations.
Figure 17:
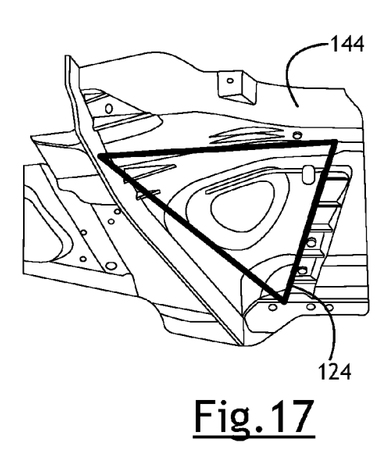
FIG. 17 illustrates a close-up outboard view of a rear truss structure with a close out panel according to a number of variations.
Figure 18:
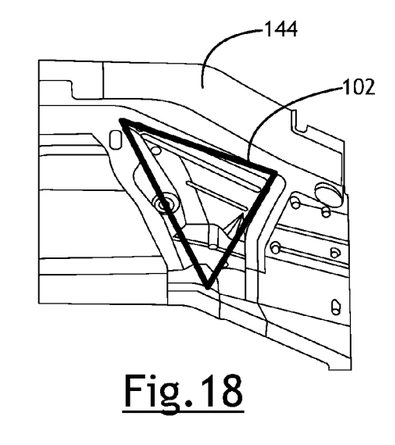
FIG. 18 illustrates a close-up outboard view of a front truss structure with a close out panel according to a number of variations.

Referring to FIGS. 15, and 17-18, in any of a number of variations, the right side and left side center tunnel close-out panels 48, 50 may be attached to the upper tunnel structure assembly 38 and the front side structure assemblies 40, 42 and the rear truss structures 112, 112'. The front portion 152 of the center tunnel close-out panel 144, 144' may be constructed and arranged to form a box section geometry over the front truss triangular depression 102, for example as illustrated in FIG. 18, which may further increase the torsional stiffness of the center tunnel assembly 30. The rear portion 154 of the center tunnel close-out panel 144 may be constructed and arranged to form a box section geometry over the rear truss triangular depression 124, for example as illustrated in FIG. 17, which may further increase the torsional stiffness of the center tunnel assembly 30. The right side and left side center tunnel close-out panel assemblies 48, 50 may be attached to the upper tunnel structure assembly 38 and the front side structure assemblies 40, 42 and the rear truss structures 112, 112' in any of a number of variations including, but not limited to, laser welding.

Figure 19:
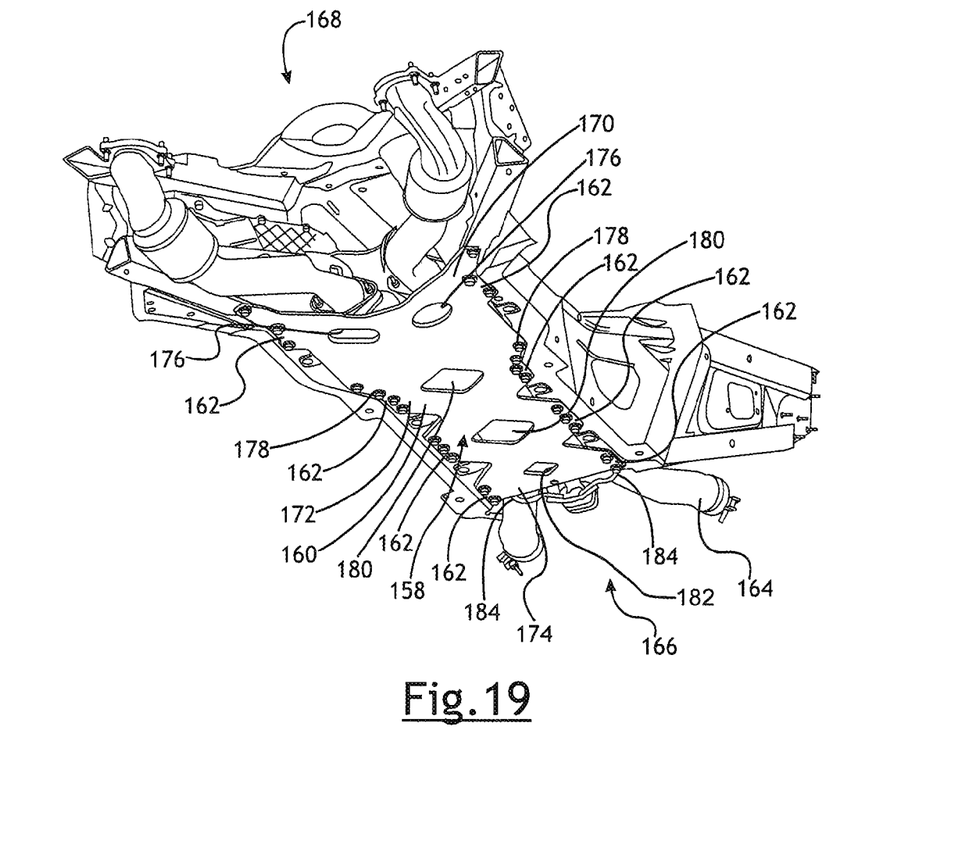
FIG. 19 illustrates a center tunnel assembly attached to a bottom close out panel according to a number of variations.

Referring to FIG. 19, in any of a number of variations, a center tunnel assembly 30 may be constructed and arranged to attach to a bottom close-out panel 156. The bottom close-out panel 156 may also include a trussing system 158 which may be constructed and arranged to work together with the center tunnel assembly 30 truss structures 58, 90, 90', 112, 112' to form various load paths which may increase the torsional stiffness of the center of the vehicle by distributing various load through the various load paths.

The bottom close-out panel 156 may include a trussing system 158 which may include a series of connected truss beams 160 or load paths which may be constructed and arranged to distribute one or more lateral loads. Ends 162 of the truss beams 160 may be aligned and/or connected to the truss structures 58, 90, 90' 112, 112'. The bottom close-out panel 156 may also include one or more openings 176, 178, 180, 182 which may act as a venting system to prevent or reduce heat which may exist from an exhaust system 164 from entering into the passenger compartment of a vehicle. In one variation, the bottom close-out panel 156 may increase in width as it extends from the rear 166 of the vehicle to the front 168 of the vehicle. The bottom close-out panel 156 may include a frontal portion 170, a middle portion 172, and a rear portion 174. The front portion 170 may include two cutouts 176 having any of a variety of shapes including, but not limited to, an oval or circular shape. The front portion 170 may have a width larger than the middle 172 and rear portions 174. A cutout 178 may also be located on each end of the bottom close-out panel 156 approximately between the middle portion 172 and the front portion 170. The middle portion 172 may be the same width as the frontal portion 170 and may include a double hexagonal-like shape which may include a cutout 180 approximately center of each hexagonal-like shape. The rear portion 174 may form a triangular-like shape which may include a cutout 182 in any of a variety of shapes including, but not limited to, a diamond shape, which may be located approximately central of the rear portion 174. The bottom close-out panel 156 may be formed in any of a variety of ways including, but not limited to stamping and laser cutting. In one variation, the bottom close-out panel 156 may be attached to the center tunnel assembly 30 by attaching the bottom close-out panel 156 beam ends 162 of the truss beams 160 to the center tunnel assembly 30 with the use of a mechanical fastener including, but not limited to, bolts 184 and/or flow drill screws.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a center tunnel assembly comprising: an upper tunnel structure assembly, a right side front structure assembly, a left side front structure assembly, a right side rear structure assembly, a left side rear structure assembly, and a right and left close out panel assembly; and wherein the center tunnel assembly is constructed and arranged to include a plurality of trusses which are constructed and arranged to distribute various loads on the center tunnel assembly.

Variation 2 may include a product as set forth in Variation 1 wherein the plurality of trusses include a right and left front truss, a center truss, and a right and left rear truss.

Variation 3 may include a product as set forth in any of Variations 1-2 wherein the right hand and the left hand front trusses are located at a front splay area of a vehicle center tunnel; wherein the center truss is located at the center tunnel shifter region of a vehicle center tunnel assembly; and wherein the left hand and right hand rear trusses are located at the rear splay area of a vehicle center tunnel assembly.

Variation 4 may include a product as set forth in any of Variations 1-3 wherein the upper tunnel structure assembly comprises an upper tunnel structure, a center truss, a front panel, and a rear panel.

Variation 5 may include a product as set forth in any of Variations 1-4 wherein the center truss is constructed and arranged to form a triangular structure to act as a truss.

Variation 6 may include a product as set forth in any of Variations 1-5 wherein the right side front structure assembly comprises a front truss and a front bracing subassembly; wherein the left side front structure comprises a front truss and a front bracing subassembly; wherein the right side rear front structure assembly comprises a rear truss and a rear bracing subassembly; and wherein the left side rear structure assembly comprises a rear truss and a rear bracing subassembly.

Variation 7 may include a product as set forth in any of Variations 1-6 wherein the front truss and rear truss are constructed and arranged to form a triangular structure to act as a truss.

Variation 8 may include a product as set forth in any of Variations 1-7 wherein the front truss and the rear truss each include a triangular depression.

Variation 9 may include a product as set forth in any of Variations 1-8 wherein the right and left front bracing subassemblies each comprise an upper lateral beam, a lower lateral beam, and a vertical beam.

Variation 10 may include a product as set forth in any of Variations 1-9 wherein the right and left rear bracing subassemblies each include a rear an upper lateral beam, a lower lateral beam, a support panel, and a lateral support.

Variation 11 may include a product as set forth in any of Variations 1-10 wherein the right and left front side structures and the right and left rear side structures are assembled via at least one of gas metal arc welding or resistance spot welding.

Variation 12 may include a product as set forth in any of Variations 1-11 further comprising a right and a left close-out panel assembly.

Variation 13 may include a product as set forth in any of Variations 1-12 wherein the right and left close out panel assemblies are attached to the upper tunnel structure assembly and the right and left front and rear side structure assemblies.

Variation 14 may include a product as set forth in any of Variations 1-13 wherein the right and left close-out panel assemblies each comprise a close-out panel, a lateral close-out panel beam, and at least one bracket.

Variation 15 may include a product as set forth in any of Variations 1-14 wherein the right and left close-out panel assemblies are constructed and arranged to form a box section with the front trusses and rear trusses.

Variation 16 may include a product as set forth in any of Variations 1-15 wherein the center tunnel assembly is constructed and arranged to attach to a bottom close-out panel.

Variation 17 may include a product as set forth in any of Variations 1-16 wherein the center tunnel assembly is attached to a bottom close-out panel.

Variation 18 may include a product as set forth in any of Variations 1-17 wherein the bottom close-out panel is constructed and arranged to distribute a plurality of loads in conjunction with the right hand and the left hand front trusses, the center truss, and the right hand and the left hand rear trusses.

Variation 19 may include a product as set forth in any of Variations 1-18 wherein the bottom close-out panel includes a series of trusses which are constructed and arranged to distribute at least one of a lateral or vertical load.

Variation 20 may include a product as set forth in any of Variations 1-19 wherein the center tunnel assembly is attached to a vehicle frame.

Variation 21 may include a product as set forth in any of Variations 1-20 wherein the right side and the left side front and rear trusses and the center truss are high pressure die cast.

Variation 22 may include a product as set forth in any of Variations 1-21 wherein the center tunnel assembly comprises aluminum.

The above description of select variations within the scope of the invention is merely illustrative in nature and, thus, variations or variants thereof are not to be regarded as a departure from the spirit and scope of the invention.

What is claimed is:

1. A product comprising:
a center tunnel assembly comprising:
an upper tunnel structure assembly, a right side front structure assembly, a left side front structure assembly, a right side rear structure assembly, a left side rear structure assembly, and a right and a left close out panel assembly;
wherein the center tunnel assembly is constructed and arranged to include a plurality of trusses comprising a right and a left front truss, a center truss, and a right and a left rear truss which are constructed and arranged to distribute various loads on the center tunnel assembly and wherein the upper tunnel structure assembly comprises an upper tunnel structure, the center truss, a front panel, and a rear panel;
wherein the right side front structure assembly comprises a front truss and a front bracing subassembly; the left side front structure assembly comprises a front truss and a front bracing subassembly; the right side rear structure assembly comprises a rear truss and a rear bracing subassembly; the left side rear structure assembly comprises a rear truss and a rear bracing subassembly; and wherein the front truss of the right side front structure assembly, the front truss of the left side front structure assembly, and rear truss of the right side rear structure assembly and the rear truss of the left side rear structure assembly are each constructed and arranged to form a triangular structure to act as a truss.

2. The product of claim 1 wherein the right and the left front trusses are located at a front splay area of the center tunnel assembly;

wherein the center truss is located at a center tunnel shifter region of the center tunnel assembly; and wherein the left hand and the right rear trusses are located at a rear splay area of the center tunnel assembly.

3. The product of claim 1 wherein the center truss is constructed and arranged to form a triangular structure to act as a truss.

4. The product of claim 1 wherein the front truss of the right side front structure assembly, the front truss of the left side front structure assembly, and the rear truss of the right side rear structure assembly and the rear truss of the left side rear structure assembly each include a triangular depression.

5. The product of claim 1 wherein the right and left front bracing subassemblies each comprise an upper lateral beam, a lower lateral beam, and a vertical beam.

6. The product of claim 1 wherein the right and left rear bracing subassemblies each include a rear upper lateral beam, a lower lateral beam, a support panel, and a lateral support.

7. The product of claim 1 wherein the right and the left side front structure assemblies and the right and the left side rear structure assemblies are assembled via at least one of gas metal arc welding or resistance spot welding.

8. The product of claim 1 wherein the right and the left close out panel assemblies are attached to the upper tunnel structure and the right and the left side front and rear structure assemblies.

9. The product of claim 1 wherein the right and left close-out panel assemblies each comprise a close-out panel, a lateral close-out panel beam, and at least one bracket.

10. The product of claim 1 wherein the right and left close-out panel assemblies are constructed and arranged to form a box section with the plurality of trusses.

11. The product of claim 1 wherein the center tunnel assembly is constructed and arranged to attach to a bottom close-out panel.

12. The product of claim 11 wherein the center tunnel assembly is attached to the bottom close-out panel.

13. The product of claim 12 wherein the bottom close-out panel includes a series of trusses which are constructed and arranged to distribute at least one of a lateral or vertical load.

14. The product of claim 12 wherein the center tunnel assembly is attached to a vehicle frame.

15. The product of claim 11 wherein the bottom close-out panel is constructed and arranged to distribute a plurality of loads in conjunction with the right and the left front trusses, the center truss, and the right and the left rear trusses.

16. The product of claim 1 wherein the right and the left front and rear trusses and the center truss are high pressure die cast.

17. The product of claim 1 wherein the center tunnel assembly comprises aluminum.

\* \* \* \* \*